W. J. Martin.
Attachment for Plow.
No. 74398. Patented Feb. 11, 1868.
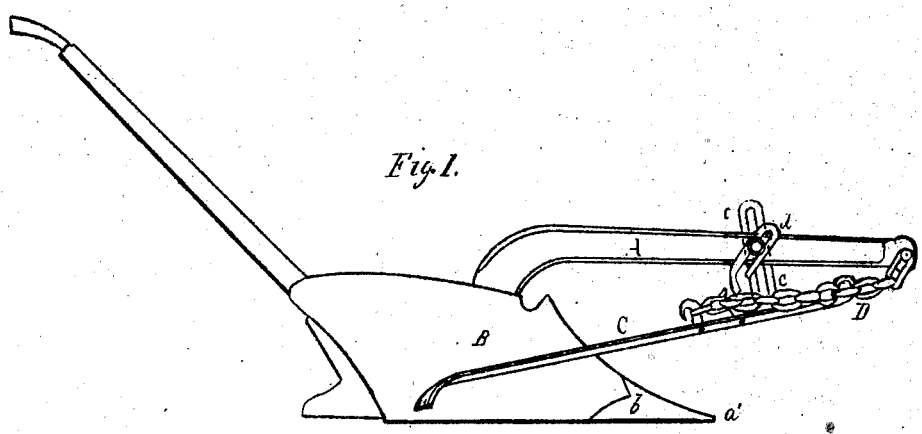
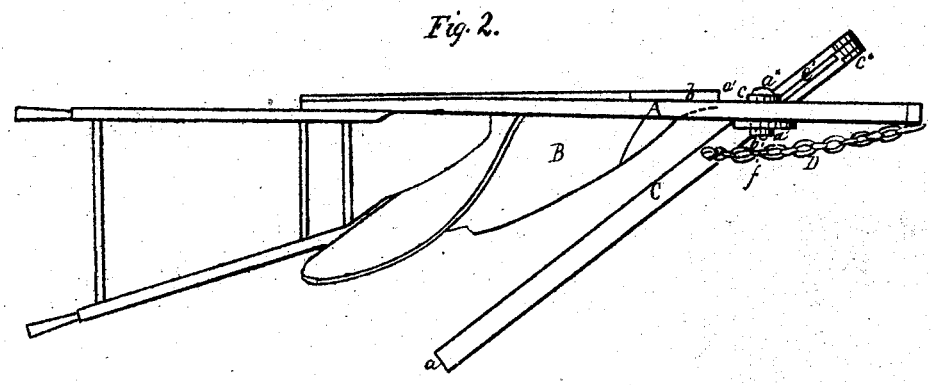
Witnesses
J. W. Coombs
A. LeClerc
Inventor
W. J. Martin
her Bran Coombs & Co
Atty

United States Patent Office.

WILLIAM J. MARTIN, OF CATAWISSA, PENNSYLVANIA.

Letters Patent No. 74,398, dated February 11, 1868.

---

IMPROVEMENT IN ATTACHMENTS FOR PLOUGHS.

---

The Schedule referred to in these Letters Patent and making part of the same.

---

TO ALL WHOM IT MAY CONCERN:

Be it known that I, WILLIAM J. MARTIN, of Catawissa, in the county of Columbia, and State of Pennsylvania, have invented certain new and useful Improvements in Attachments for Ploughs; and I do hereby declare that the following is a full, clear, and exact description of the same, reference being had to the accompanying drawings, making a portion of this specification, in which—

Figure 1 is a side view of a plough fitted with an attachment made according to my invention.

Figure 2 is a plan view of the same.

Similar letters of reference indicate corresponding parts in both figures.

In ploughing ground covered with a growth of tall weeds, cornstalks, or other like vegetation, much difficulty is experienced in turning such vegetation completely over, and covering the same with the furrow. The object of this invention is to provide an effective means of obviating this difficulty, and it consists in a sweep or bar, attached to the beam, and arranged in such relation with the mould-board of the plough that when the plough is in use, the said bar will bend or throw the weeds, &c., away from the mould-board, and bring them toward the ground in such manner as to prevent them from interfering with the operation of the mould-board in inverting the furrow.

The invention further consists in a novel means of adjusting the aforesaid bar, whereby it may be readily secured in such position as to insure its most efficient operation under different circumstances of depth of furrow, or average height of weeds or vegetation.

The invention further consists in a novel means, whereby the wrenching of the bar or sweep from its fastenings is provided against.

To enable others to understand the nature and construction of my invention, I will proceed to describe it with reference to the drawings.

The invention is designed to be applied to ploughs of any suitable construction, A indicating the beam and B the mould-board of such plough. C represents a sweep or bar, made, preferably, of wrought iron, and attached, as hereinafter presently explained, to the beam, B, the bar being placed in a position nearly parallel with the face of the mould-board, and at an angle to that of the beam, as more fully indicated in fig. 2. The outermost end of the bar being placed at a distance from the face of the mould-board, not exceeding the height from the bottom of the furrow of the vegetation to be turned under, the bar C should be curved downward, as shown more clearly at $a$, in fig. 1, and its opposite or inner extremity is designed to extend inward, somewhat beyond the point $a'$ of the share $b$. The bar C is secured to the beam A by means of two links, $c\ d$, the link $c$ being provided with an arm or shank, $c'$, pivoted to the inner end of the said bar by a transverse pivot, as shown at $c^*$, and the link $d$ being pivoted to or connected with the bar at a point at the opposite side of the beam. The two links extend upward, one upon each side of the beam, and are firmly clamped thereto by the head, $a^*$, and nut, $b^*$, respectively, of a tightening-bolt, $f$, the bar being thus rigidly affixed to the beam. By raising or lowering the two links $c\ d$, the bar may be adjusted at a greater or less height from the ground, according as the vegetation to be turned or ploughed under is higher or lower. By moving the lower portions of the links toward or from the mould-board, the bar may be adjusted at any required distance therefrom, and by varying the position of the said links with reference to each other, the bar may be brought to any required angle to the face of the mould-board or to the beam. Extended from the forward end of the beam A, to any desired point of the outermost portion of the bar C, is a chain, D, which serves as a brace to sustain the bar C against the rearward strain exerted thereon by the weeds, cornstalks, &c., which are pressed forward and downward by the action of the said bar, as presently herein explained.

As the plough is drawn along in the operation of ploughing, the sweep or bar C strikes the cornstalks, weeds, or other rank or tall vegetation, and bends the same forward, bringing it comparatively close to the ground, so that it cannot come against the mould-board B, which is thus enabled to turn the soil in a continuous and unbroken furrow, completely inverting the same, and of course burying underneath it the cornstalks, weeds, and like vegetation, thereby effectually securing the object sought to be attained by the invention.

What I claim as my invention, and desire to secure by Letters Patent, is—

1. The sweep or bar C, attached to the beam A, and arranged in relation with the mould-board D, substantially as and for the purpose specified.

2. The adjusting-links c d, and tightening-bolt f, in combination with the sweep or bar C and the beam A, substantially as and for the purpose specified.

3. The chain or brace D, arranged in relation with the sweep or bar C and the beam A, substantially as and for the purpose specified.

WILLIAM J. MARTIN.

Witnesses:
  STEPHEN BALDY,
  L. KEILER.